United States Patent [19]
Barber

[11] 3,913,673
[45] Oct. 21, 1975

[54] OIL RECOVERY PROCESS WHICH PROVIDES FOR THE TREATMENT OF PRODUCED WATER BEFORE IT IS REINJECTED TO DRIVE OIL TOWARD THE PRODUCTION WELLS

[75] Inventor: Ernest C. Barber, Valhalla, N.Y.

[73] Assignee: Texaco Inc., New York, N.Y.

[22] Filed: June 3, 1974

[21] Appl. No.: 475,363

Related U.S. Application Data

[63] Continuation-in-part of Ser. No. 199,777, Nov. 17, 1971, Pat. No. 3,844,942.

[52] U.S. Cl. .................. 166/266; 210/50; 210/61; 210/63
[51] Int. Cl.² ................ E21B 43/00; B01J 9/04
[58] Field of Search ............ 55/73, 89, 93, 94, 228; 166/266, 267, 310; 210/44, 47, 49, 50, 59, 61, 63; 423/573, 577

[56] References Cited
UNITED STATES PATENTS

| | | | |
|---|---|---|---|
| 1,937,196 | 11/1933 | Gollmar | 423/573 L X |
| 2,772,146 | 11/1956 | Pippig | 423/573 L |
| 3,039,855 | 6/1962 | Urban | 423/573 L |
| 3,150,716 | 9/1964 | Strelzoff et al. | 166/266 X |
| 3,518,812 | 7/1970 | Kolm | 55/89 X |
| 3,536,619 | 10/1970 | Urban et al. | 210/50 |
| 3,576,738 | 4/1971 | Duffy | 210/44 |
| 3,618,667 | 11/1971 | Snavely, Jr. | 210/63 X |
| 3,725,264 | 4/1973 | Wheeler | 210/44 |

*Primary Examiner*—Samih N. Zaharna
*Assistant Examiner*—Robert H. Spitzer
*Attorney, Agent, or Firm*—T. H. Whaley; C. G. Ries; Kenneth R. Priem

[57] ABSTRACT

A process for the recovery of oil from subterranean formations in which water is injected into the formation via an injection well and a mixture of oil and water contaminated with hydrogen sulfide is produced through a production well. After separation of the oil the hydrogen sulfide contaminated water is subjected to a treatment wherein catalyst is added to the water and fresh air is used to scrub said contaminated water to thereby provide water cleansed of hydrogen sulfide because of catalytic oxidation and stripping, and air contaminated with the stripped hydrogen sulfide, and then treating all of the contaminated air with at least a portion of the cleansed water to remove said hydrogen sulfide from said air prior to discharge into the atmosphere. The cleansed water is then injected into the injection well.

2 Claims, 3 Drawing Figures

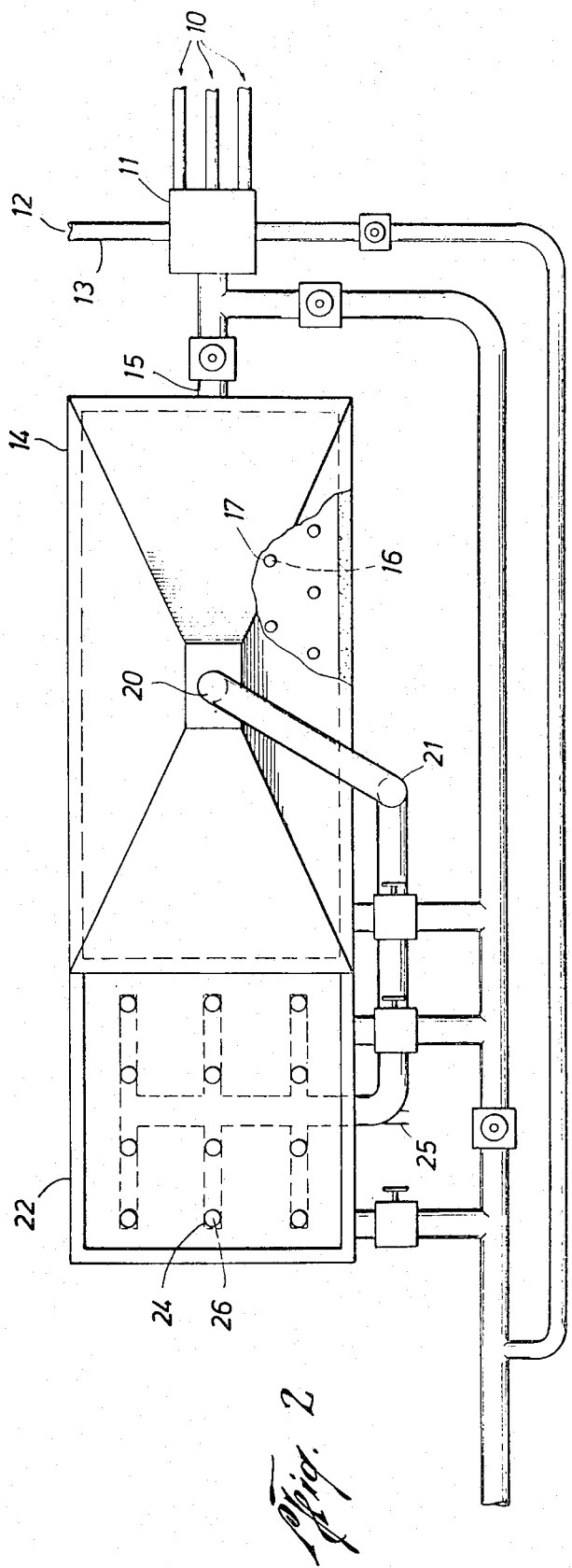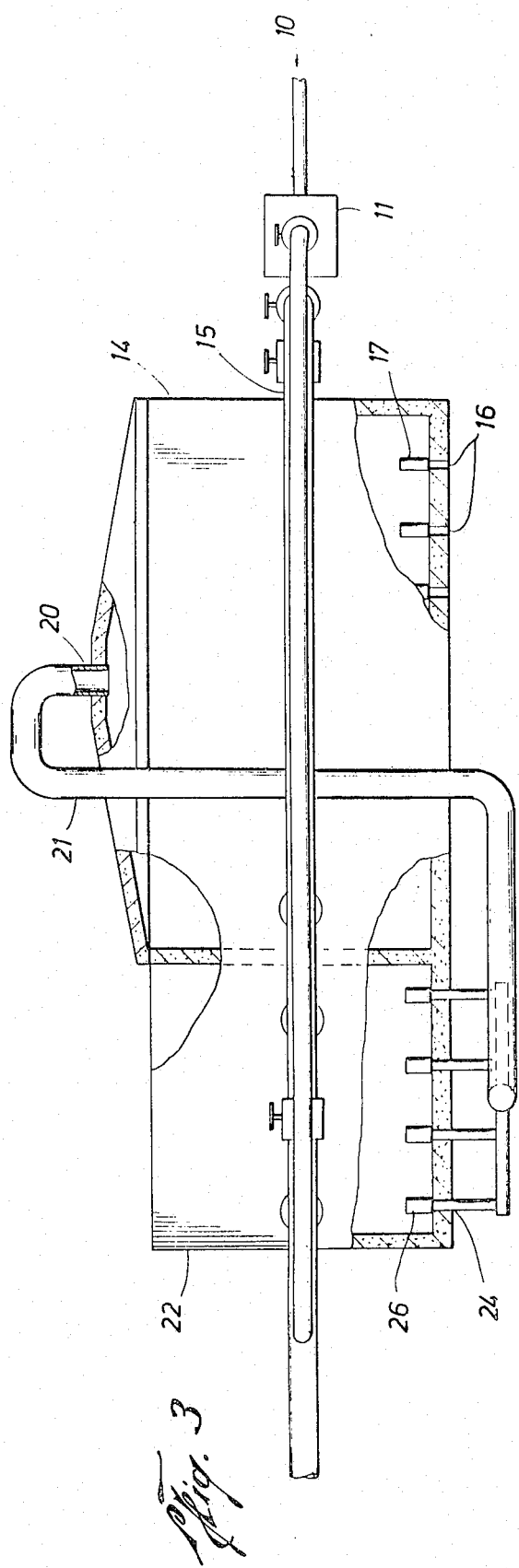

OIL RECOVERY PROCESS WHICH PROVIDES FOR THE TREATMENT OF PRODUCED WATER BEFORE IT IS REINJECTED TO DRIVE OIL TOWARD THE PRODUCTION WELLS

This is a Continuation-in-Part of Application Ser. No. 199,777, filed Nov. 17, 1971, now U.S. Pat. No. 3,844,942.

BACKGROUND OF THE INVENTION

1. Field of the Invention

This invention pertains to the field of petroleum recovery and the treatment of water produced with the petroleum which is contaminated with hydrogen sulfide.

2. Discussion of the Prior Art

Hydrogen sulfide is a highly toxic gas with a powerful and offensive odor. Even in low concentrations the odor of hydrogen sulfide is a nuisance because of its offensive character. Hydrogen sulfide containing water is also highly corrosive. Hydrogen sulfide is often an acute problem in oil production operations. Often water is produced along with oil from underground hydrocarbon reservoirs. Certain reservoirs also contain hydrogen sulfide gas which is dissolved in large concentrations in the produced water. Water containing hydrogen sulfide in this way is referred to as sour water. As this water is produced with the oil, it is usually separated from the oil in the field and sent to large open ponds before further use is made of it. These ponds are usually at atmospheric pressure. As this produced water reaches the pond and atmospheric pressure the hydrogen sulfide becomes less soluble in water and begins to escape into the atmosphere. The result is pollution of the air by this offensive gas. Efforts to prevent hydrogen sulfide from escaping into the atmosphere have heretofore been inefficient, ineffective or too costly. Chlorination and precipitation are methods that have been attempted in an effort to remove hydrogen sulfide from water. However, hydrogen sulfide removal by chlorination is useful only where the water contains very little hydrogen sulfide. Where the amount of hydrogen sulfide gas becomes substantial, as in sour water, the cost of chlorine gas makes the process uneconomical. Precipitation methods are likewise prohibitively expensive as is electrolysis.

I. S. Snavely and S. T. Blount, Corrosion, Volume 25, page 297, 1969, describe a method of oxygen scavenging in water with hydrogen sulfide using a transition metal catalyst. The process of this invention on the other hand is a method in which hydrogen sulfide dissolved in water may be reacted with oxygen in the presence of a transition metal catalyst yielding elemental sulfur in solid form which may then be removed by conventional means.

U.S. Pat. No. 3,576,738 describes a process whereby sour water, air and a soluble nickel compound is subjected to pressure so that some of the air dissolved in the sour water. A reaction takes place between the dissolved oxygen in the air and the hydrogen sulfide under the pressurized conditions. The mixture is then depressurized allowing the air and dissolved unreacted hydrogen sulfide to come out of solution and escape from the water. The method of this patent, however, has severe disadvantages which will limit its usefulness. Increasing pressure is not an efficient way of increasing oxygen transfer into water. The amount of oxygen which can be dissolved will have direct bearing on the amount of hydrogen sulfide which will be reacted. Also, very large pressure vessels and expensive pressurizing equipment will be needed to operate under the method of the patent. The method of the patent will inherently provide a fairly high level of hydrogen sulfide as off gas because of its mode of operation. Since the process of the patent uses an ineffective method of dissolving oxygen with water some hydrogen sulfide will remain unreacted. As the dissolved oxygen and inert gases mixed with it come out of solution and bubble through the water the unreacted hydrogen sulfide will be stripped into the air above the water. The patent provides no technique for disposing of this escaped hydrogen sulfide. The process of my invention solves those problems by operating at atmospheric pressure. Further, my invention provides for a reactor having at least two stages wherein any hydrogen sulfide left unreacted in the first stage and stripped from the water into the gas above the water will be introduced into second and subsequent stages wherein it will be essentially completely reacted and removed, so that no hydrogen sulfide will be stripped into the atmosphere from the second stage. Air containing oxygen is pumped through a plurality of openings in the bottom of the reactor which finely divide the air into small bubbles. The air is dissolved in the water by absorption. Mixers located in the reactor beneath the water may or may not be used to aid dissolution as needed. The mixers used in my process may be operated by the action of the air bubbling through them or may be motor driven. The use of mixers often effectively increases the rate of oxygen absorption into the water by breaking the air into very fine bubbles to maximize the air water interfacial area. The greater this interfacial area the greater the rate of absorption of oxygen into the water. Mixers are not always required and should be eliminated where dissolution takes place without them in order to minimize equipment problems. Also, the method of the patent is limited to nickel catalyst. However, my invention will operate satisfactorily with all transition metal catalysts which are soluble in water.

SUMMARY OF THE INVENTION

A process for the recovery of oil from subterranean formations in which water is injected into the formation via an injection well and a mixture of oil and water contaminated with hydrogen sulfide is produced through a production well. After separation of the oil the hydrogen sulfide contaminated water is subjected to a treatment wherein catalyst is added to the water and fresh air is used to scrub said contaminated water to thereby provide water cleansed of hydrogen sulfide because of catalytic oxidation and stripping and air contaminated with the stripped hydrogen sulfide, and then treating all of the contaminated air with at least a portion of the cleansed water to remove said hydrogen sulfide from said air prior to discharge into the atmosphere. The cleansed water is then injected into the injection well.

My invention is also, more generally, a process for the air purification of catalyst containing water from any source contaminated with hydrogen sulfide and for the purification of the treating air which comprises scrubbing the contaminated water with fresh air to thereby provide cleaned water and air contaminated with hydrogen sulfide and then treating all of the contaminated air with at least a portion of the cleaned water to remove the hydrogen sulfide from the air prior to discharge into the atmosphere. The process involves providing a plurality of reactors for the air treatment of sour water connected in series. The first reactor in each set is a container which shall hold water and is covered to prevent gas leakage to the atmosphere. Subsequent reactors in each set are containers much like the first one except that the last one need not be covered. Hydrogen sulfide ladened water mixed with a suitable oxidation catalyst is introduced into the first reactor which is at atmospheric pressure. Oxygen is dissolved in the water so that the hydrogen sulfide gas which evolves from the water in the first reactor is introduced into the second reactor containing water, dissolved catalyst and dissolved oxygen. This hydrogen sulfide is dissolved into the water in the second reactor. Any unreacted hydrogen sulfide from the second reactor is collected and introduced into a subsequent reactor and so on until the hydrogen sulfide is virtually all reacted.

BRIEF DESCRIPTION OF THE DRAWINGS

FIGS. 2 and 3 depict a typical apparatus for the air treatment of the sour water.

DESCRIPTION OF THE PREFERRED EMBODIMENTS

Figure 1:
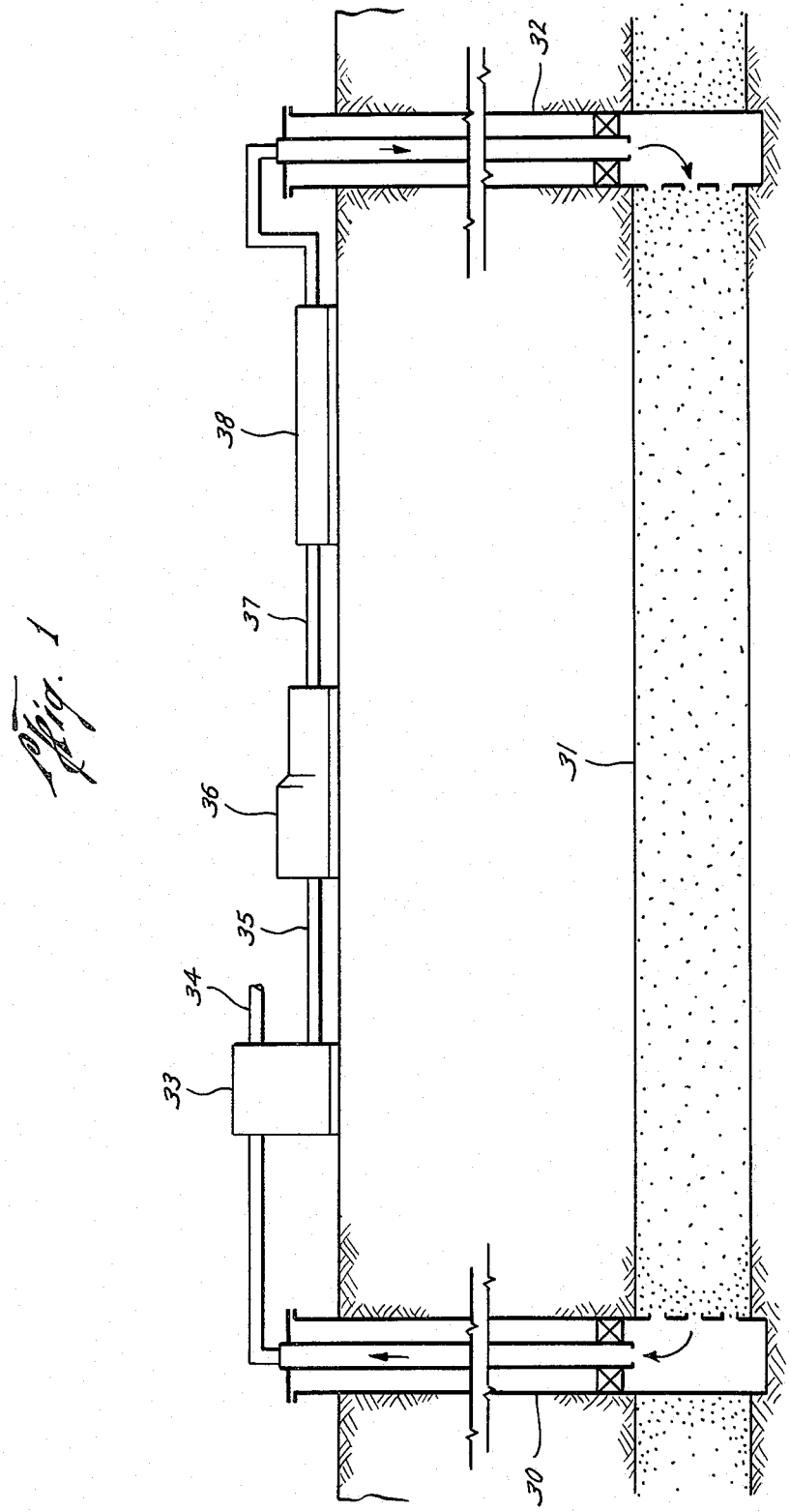
FIG. 1 schematically depicts a typical process within the scope of my invention.

My invention is applicable to the treatment of hydrogen sulfide ladened water which is produced from subterranean hydrocarbon reservoirs along with oil. It is also applicable to the treatment of sour water from any source. However, in an oil field operation, as the water and oil come to the surface they are separated in treatment facilites located in the oil field. The water often contains considerable amounts of dissolved hydrogen sulfide which is not removed in these facilities. The hydrogen sulfide ladened water is then pumped or gravity fed to the reactors of my invention. Only the pressure necessary to move the water need be used to introduce the water into the reactors. To prevent hydrogen sulfide contamination of the air it is necessary that the water be kept in covered conduits and containers until it reaches the reactors of my invention. The term sour water as used herein is, of course, intended to encompass sour brine and any mineral ladened sour water as well as hydrogen sulfide containing fresh water.

As the water reaches the reactors a catalyst which is soluble in the water and useful for oxidation purposes is introduced and dissolved in the water. Preferred catalysts are transition metal salts. Within this class the preferred catalysts are nickel chloride and cobalt chloride. The amount of catalyst is not critical as long as there is sufficient catalyst to promote the reaction between oxygen and hydrogen sulfide. Amounts as low as 0.001 parts per million (ppm) of catalyst based on the sour water are usually sufficient to catalyze the reaction between hydrogen sulfide and oxygen. Amounts up to the limit of solubility of the catalyst in the water may be used, but not much improvement in the reaction is realized above 2.0 ppm. It is preferred to use from about 0.1 to about 2 ppm of catalyst.

The reactor to be used in my invention may be of varying types but is is required that it be in at least two stages. Generally, the reactor should be in the form of a container which will hold water in sufficient amounts to continuously treat water produced from a particular oil field or section of an oil field. Each stage of the reactor except the last is required to have a cover to prevent the escape of hydrogen sulfide into the atmosphere. Sour water from production wells is introduced into this first stage at atmospheric pressure and the reactor is operated at atmospheric pressure during the course of treatment of the sour water. The reactor may be constructed of any material which is unreactive with hydrogen sulfide or salt water. The second and any subsequent stages of the reactor are also in the form of a container to hold water. However, the last is not required to be covered since by this time essentially all of the hydrogen sulfide should be reacted and there will no longer be significant amounts of hydrogen sulfide evolving into the air. The oxygen to be used to react with the hydrogen sulfide may be pure or contain an otherwise inert gas. Air for example, would be a suitable source of oxygen. The oxygen should be present in such concentrations so that there is an amount in excess of that needed to convert hydrogen sulfide to elemental sulfur. This is true in each stage of the reactor. The amount of oxygen needed will be determined by balancing the amount of oxygen that can be effectively used in the reaction and the amount of stripping of hydrogen sulfide which takes place. The stripping should be kept at a minimum while trying to react as much hydrogen sulfide as possible. In each stage the amount of oxygen should be such that essentially all of the hydrogen should theoretically be reacted to reduce the number of stages needed. Of course, some hydrogen sulfide may escape since absorption of hydrogen sulfide and oxygen may not be complete and, therefore, all of it may not react. The amount of hydrogen sulfide finally allowed to escape, if any, should be so small that it will be dissipated within a few hundred feet of the reactor so that no odor problem in the surrounding area will result.

In each stage a maximum amount of oxygen and hydrogen sulfide should be dissolved to insure more complete reaction. In order to accomplish this the oxygen is introduced into the bottom of the first stage reactor where it is finely divided by means of openings near the bottom of the container. Mixers may also be provided if necessary. The same type of dissolution is to be effected in the subsequent stages where the hydrogen sulfide and oxygen which escaped from the water in the previous stage will be taken and pumped into the bottom of the next stage. It is essential to the proper operation of my invention that this surprising step be taken. After the water in the first stage is essentially rendered free of hydrogen sulfide by either reaction with oxygen or stripping, the gas above the water in the first stage which may be ladened with stripped hydrogen sulfide is reinjected into water in the second stage which contains dissolved catalyst and, if needed, additional oxygen. If necessary any hydrogen sulfide collecting above the water in the second stage is collected and reinjected into the bottom of a third stage and so on until the hydrogen sulfide is essentially completely reacted. This reinjection of hydrogen sulfide in water in the subsequent stages provides a medium for the completion of the reaction of hydrogen sulfide and provides a use for the water from the previous stages. It is important and essential to the operation of my invention that sufficient to an ample amount of oxygen be dissolved into the hydrogen sulfide ladened water so that the reaction is completed in as few stages as possible.

The water used in my invention is produced from subterranean hydrocarbon reservoirs and contains dissolved hydrogen sulfide. The pH of the water should be below 7 to prevent formation of insoluble sulfide salts with the metal ion of the catalyst used. These insoluble salts will not form in an acid medium as they are soluble therein. The soluble transition metal ion, therefore, will remain soluble in an acidic medium and will be homogeneously dispersed throughout the water providing for efficient catalytic activity. The sulfur product of the reaction between oxygen and hydrogen sulfide may be removed by conventional means known to those skilled in the art.

The process of my invention may be more easily understood by referring to the following figures which illustrate an example of a process within the scope of my invention.

FIG. 1 depicts a typical overall process within the scope of my invention. Well 30 is a production well penetrating an oil reservoir 31 which is also penetrated by an injection well 32. Oil and sour water are produced via well 30 and proceed to separator 33 where the oil and water are separated into fairly distinct phases. The oil then proceeds to a destination, not shown, via conduit 34. The sour water proceeds via conduit 35 to the sour water air treating apparatus 36 (shown in more detail in FIGS. 2 and 3). The water free of hydrogen sulfide proceeds via conduit 37 to a holding tank 38. From here a portion or all of the water is injected back into the reservoir 31 via injection well 32.

FIG. 2 is a planned view of the sour water air treating part of the process wherein hydrogen sulfide ladened water is reacted with oxygen to remove the hydrogen sulfide from the water and reduce it to elemental sulfur so that it will not contaminate the atmosphere. Sour water 10 ladened with hydrogen sulfide gas is gathered at a collecting point 11 where catalyst 12 is introduced through a line 13. The sour water with dissolved catalyst enters a covered water tight container 14 through line 15. Oxygen is introduced into the container 14 through a plurality of openings 16 in the bottom of the container. A portion of these openings are shown in the cutaway view. A portion of the oxygen is dissolved in the water by static mixers 17 attached to the bottom of the covered container and shown in side view in FIG. 3. The dissolved oxygen reacts with the hydrogen sulfide in the water to form elemental sulfur and water. Undissolved oxygen bubbles through the water stripping any unreacted oxygen and hydrogen sulfide from solution. The mixture of unreacted oxygen and hydrogen sulfide bubble through the water and collect above the water level in the covered container. This mixture of gases is gathered by a collection device 20 and transported by a line 21 to the bottom of the second container 22 which is uncovered and contains water and dissolved catalyst. The mixture of gases enters the second container through openings 24 in the bottom of the second container. Water and dissolved catalyst in the second container may come from the first container provided it is taken from the opposite end of the introduction of the initial sour water into the first container, so that there is little or no hydrogen sulfide gas dissolved in the water in the second container. If required, a line 25 simultaneously brings additional oxygen to the second container sufficient to completely react with the incoming hydrogen sulfide. Static mixers 26, as in the first container, dissolve the oxygen and hydrogen sulfide in the water and catalyst mixture. The uncontaminated water leaving the second container may be disposed of or reused in any way. The gas emerging from the water above the second container will be essentially free of hydrogen sulfide.

I claim:

1. A process for the recovery of oil from subterranean formations comprising:
   a. injecting water into the formation via an injection well;
   b. producing a mixture of oil and sour water contaminated with hydrogen sulfide through a production well;
   c. separating the oil and sour water contaminated with hydrogen sulfide;
   d. dissolving a catalytic amount of a soluble transition metal salt in the hydrogen sulfide ladened water;
   e. introudcing the hydrogen sulfide ladened water and catalyst into a covered container which is gas tight and is at atmospheric pressure;
   f. introducing an amount of oxygen into the water in the container which is at least stoichiometric with the amount of hydrogen sulfide dissolved in the water;
   g. dissolving the oxygen in the water by mixing to effect a reaction between the oxygen and hydrogen sulfide;
   h. collecting any hydrogen sulfide which evolves from the water in the container;
   i. dissolving this collected hydrogen sulfide into water from said covered container containing dissolved catalyst in a second container;
   j. dissolving sufficient additional oxygen into the water in the second container to at least stoichiometrically convert all the said collected hydrogen sulfide to elemental sulfur, and
   k. repeating steps h through j in additional containers, as needed, until essentially all of the hydrogen sulfide is reacted; and
   l. injecting the hydrogen sulfide free water into the formation as in step (a).

2. A process as in claim 1 wherein the catalyst comprises nickel chloride.

* * * * *